(12) United States Patent
Brandt

(10) Patent No.: US 8,312,906 B2
(45) Date of Patent: Nov. 20, 2012

(54) METHOD AND DEVICE FOR POSITIONING STRINGERS ON AN AIRCRAFT SKIN, IN PARTICULAR ON A WING SKIN

(75) Inventor: Juergen Brandt, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 178 days.

(21) Appl. No.: 12/511,582

(22) Filed: Jul. 29, 2009

(65) Prior Publication Data

US 2010/0038024 A1 Feb. 18, 2010

Related U.S. Application Data

(60) Provisional application No. 61/188,806, filed on Aug. 13, 2008.

(51) Int. Cl.
*B32B 38/10* (2006.01)
*G05B 19/19* (2006.01)

(52) U.S. Cl. .............. 156/379.8; 156/380.9; 156/499; 156/574

(58) Field of Classification Search ............ 156/538, 156/499, 574, 379.6, 378.9, 380.9
See application file for complete search history.

(56) References Cited

U.S. PATENT DOCUMENTS

| | | | | |
|---|---|---|---|---|
| 4,475,976 A * | 10/1984 | Mittelstadt et al. | ........... | 156/286 |
| 4,557,790 A * | 12/1985 | Wisbey | ........... | 156/511 |
| 5,066,352 A * | 11/1991 | Albers et al. | ........... | 156/265 |
| 5,538,589 A * | 7/1996 | Jensen et al. | ........... | 156/581 |
| 7,503,368 B2 * | 3/2009 | Chapman et al. | ........... | 156/425 |
| 7,788,784 B2 * | 9/2010 | Absalonson et al. | ........... | 29/464 |
| 7,909,952 B2 * | 3/2011 | Kato | ........... | 156/92 |
| 2005/0056362 A1 * | 3/2005 | Benson et al. | ........... | 156/163 |
| 2006/0260751 A1 * | 11/2006 | Lauder et al. | ........... | 156/382 |
| 2008/0145592 A1 * | 6/2008 | Johnson | ........... | 428/73 |
| 2008/0157437 A1 * | 7/2008 | Nelson et al. | ........... | 264/405 |
| 2009/0301648 A1 * | 12/2009 | Hogg et al. | ........... | 156/230 |
| 2010/0024971 A1 * | 2/2010 | Benson et al. | ........... | 156/245 |
| 2010/0038024 A1 * | 2/2010 | Brandt | ........... | 156/249 |
| 2011/0003111 A1 * | 1/2011 | Benson et al. | ........... | 428/113 |

FOREIGN PATENT DOCUMENTS

DE 102008041190 A1 * 3/2010

* cited by examiner

*Primary Examiner* — Katarzyna Wyrozebski Lee
*Assistant Examiner* — Margaret Squalls
(74) *Attorney, Agent, or Firm* — Jenkins, Wilson, Taylor & Hunt, P.A.

(57) ABSTRACT

Until now, an orientation pattern has been projected onto the skin by means of lasers. The stringers provided with an adhesive film are then positioned by hand on the skin and fixed by pressure weights. A precision of ±3 mm is thus achieved. The fine positioning takes place by means of comb templates. The templates are set one after the other, pressure weights being removed from the stringers after each setting, so a manual orientation of the stringers is made possible. The weights are then set again. The imprecision is still ±1.4 mm. This procedure is very time-consuming and not precise enough. It is therefore proposed to use a gantry robot with a gripper beam to position the stringers, the gantry robot cooperating with a loading unit and a heating station. The time spent is thus substantially reduced and the precision of the product is decisively increased.

13 Claims, 4 Drawing Sheets

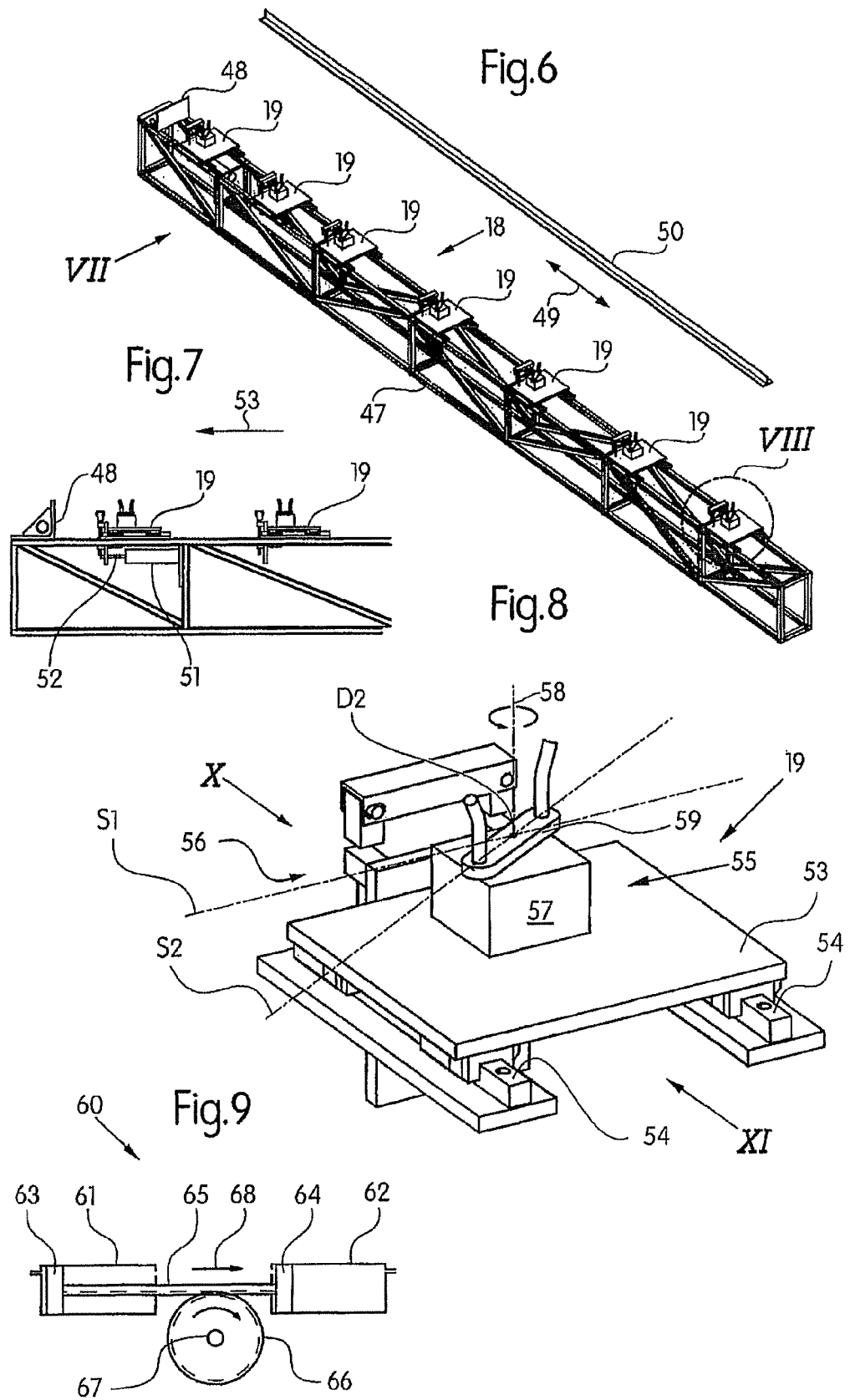

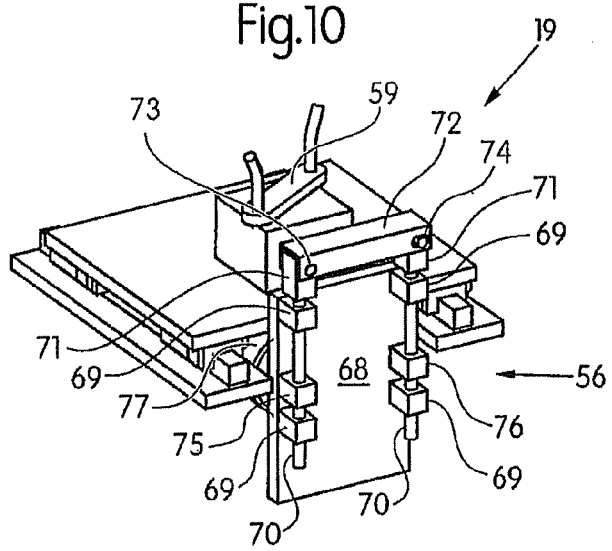
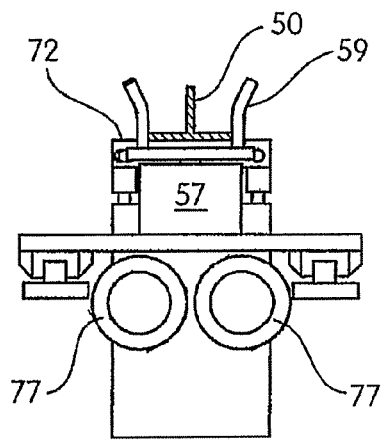
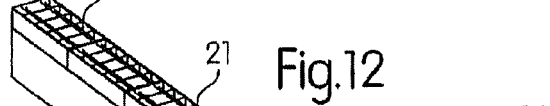
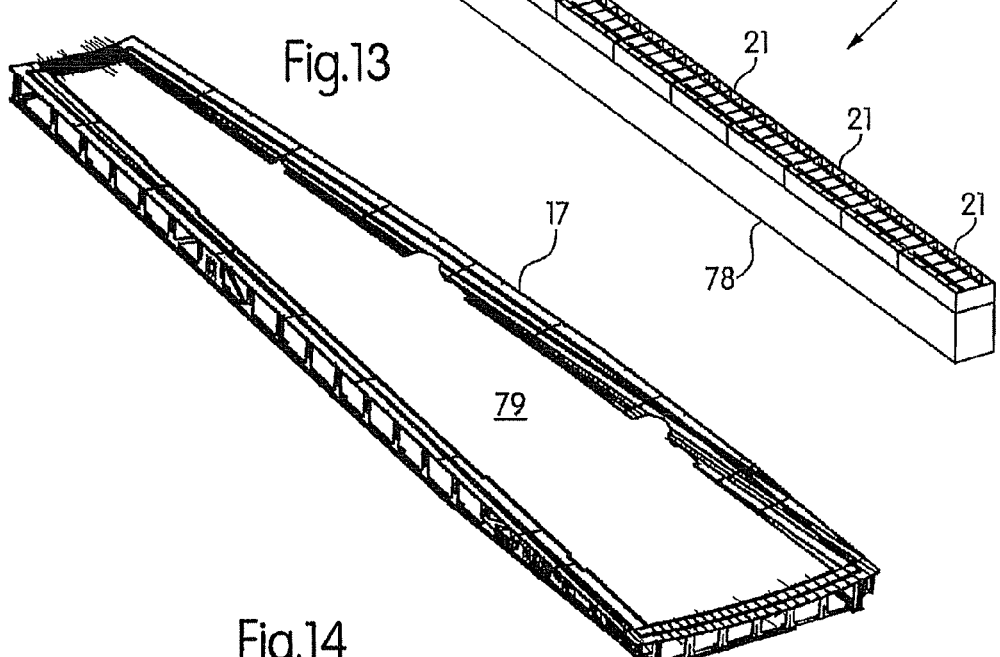
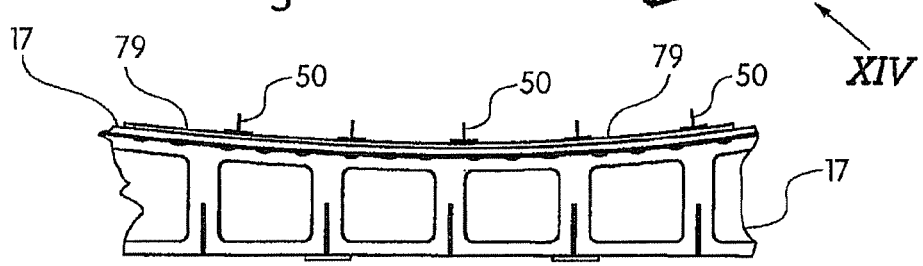

METHOD AND DEVICE FOR POSITIONING STRINGERS ON AN AIRCRAFT SKIN, IN PARTICULAR ON A WING SKIN

CROSS-REFERENCE TO RELATED APPLICATIONS

This application claims the benefit of U.S. Provisional Application No. 61/188,806, filed Aug. 13, 2008, the entire enclosure of which is herein incorporated by reference.

FIELD OF THE INVENTION

The invention relates to a method for positioning stringers, in particular on a wing skin, and to a device for carrying out this method, both the wing skin and the stringers consisting of a fibre-reinforced plastics material. This produces a wing or tail unit shell. These shells are important components of a wing or tail unit. With the use of further components, two shells of this type are used to construct a wing or tail unit box. A box of this type substantially consists of an upper shell, a lower shell and a front spar and a rear spar and the relevant ribs. In this case, the geometries of the upper shells and the lower shells are basically different. In contrast to this, the shells of a lateral tail unit are always mirror-inverted. The principle structure of a wing box substantially coincides with that of a tail unit box. Therefore, the terms wing shell or wing box used below also relate to corresponding components of a tail unit. A wing shell forms a part of the outer skin of the wing and generally has an elongate trapezoidal shape in the direction of the wing span and is outwardly slightly curved. This curvature is produced from the aerodynamic outer shape (profile) of the wing. The stringers are integrated adjacently at approximately the same spacing, running longitudinally, on the inner face of the shell. When connecting the stringers to the skin, care has to be taken that the positions of the individual stringers coincide as precisely as possible with the positions given in the construction documents. This ensures that when assembling the wing shells with the relevant spars and ribs, an adequate fitting accuracy is produced. The wing shell and the stringers in each case consist of fibre-reinforced plastics material. In this case, the stringers are already cured when they are connected to the skin. To position the stringers on the skin, the procedure was hitherto as follows. The skin is fixed to a laminating adhesion device (LAD) using the receiving points provided for this. Then an orientation pattern, formed from corresponding lines, is projected onto the shell by means of laser optics, the position of each individual stringer being indicated. The stringers provided in the meantime with an adhesive film are now positioned by hand on the shell using the laser lines and fixed by pressure weights. In this pre-positioning, a precision of ±3 mm is achieved. The subsequent fine positioning takes place with the aid of a plurality of comb templates, which are inserted equidistantly in the longitudinal direction of the wing shell in fitting holes of the LAD. The setting of the comb templates takes place consecutively, the pressure weights being briefly removed again from the stringers on each setting, on the two sides of the comb template, so a manual placing of the stringers on the comb template is made possible. The stringers are twisted and bent differently as a function of their type and deposited on the skin with a defined pressure force. The aim is the setting of all the stringers of a shell within a work shift of seven hours while adhering to the admissible position tolerances, wherein the positions and pressure forces of the stringers set should be logged and archived.

In this case, it is disadvantageous that the time targets, in particular as a result of the high manual work outlay, cannot be adhered to. It is furthermore disadvantageous that, at up to 1.4 mm, the implemented position deviations of the stringers are still outside admissible limits. A further disadvantage of this procedure is that new comb templates have to be produced for each wing with a new geometry. In addition, comb templates may come into contact with adhesive and then have to undergo expensive cleaning, whereby their dimensional stability suffers. It is furthermore disadvantageous that, in this method, essential work has to be achieved by human physical force, so the size of the shells to be produced is limited to dimensions which can be handled.

SUMMARY OF THE INVENTION

The invention is therefore based on the object of disclosing a method for positioning stringers on a wing skin, the stringers consisting of an already cured fibre-reinforced plastics material, in such a way that both the assembly times during positioning of the stringers and the position deviations thereof are clearly reduced and wing skin dimensions, which could previously not be handled, can be implemented. This object is achieved according to the invention by a method with the sequence of the following program-controlled working steps.
  a. aligning a stringer in a loading unit,
  b. removing the stringer from the loading unit by a gantry robot using a gripper beam and manual removal of a protective film,
  c. moving the stringer into a heating station by means of the gripper beam and activating an adhesive by heating,
  d. moving the stringer to a predetermined position on a wing skin and pressing the stringer by a plurality of linear parts and
  e. curing the adhesive.

The object of the invention is also to disclose a device for carrying out this method in such a way that the aforementioned advantageous effects are achieved thereby.

This object is achieved according to the invention, in that the device substantially consists of a gantry robot with a gripper beam, which cooperates with a loading unit and a heating station and can be program-controlled by means of a numeric process computer.

Advantageous configurations of the invention are disclosed in the sub-claims.

It is advantageous, in particular, in this case, that the device according to the invention substantially contributes to an accelerated manufacturing sequence and the positioning of the individual stringers takes place simultaneously with higher precision. A further advantage of the invention is that the setting up and care of comb templates for lower shells and upper shells is dispensed with without replacement. In the case of changes, only a reprogramming of the numeric controller is necessary because of the new component geometry.

BRIEF DESCRIPTION OF THE DRAWINGS

The invention is shown in the drawings and described in more detail with the aid of the description.

In the drawings:

FIG. 6 shows a loading unit, FIG. 7 shows the partial view VII according to FIG. 6, FIG. 8 shows a positioning unit in the detail VIII according to FIG. 6, FIG. 9 shows a pneumatic cylinder, FIG. 10 shows the view X according to FIG. 8, FIG. 11 shows the view XI according to FIG. 8, FIG. 12 shows a heating station, FIG. 13 shows a laminating adhesion device and FIG. 14 shows a partial view in the direction V according to FIG. 13.

DETAILED DESCRIPTION OF THE DRAWINGS

Figure 1:
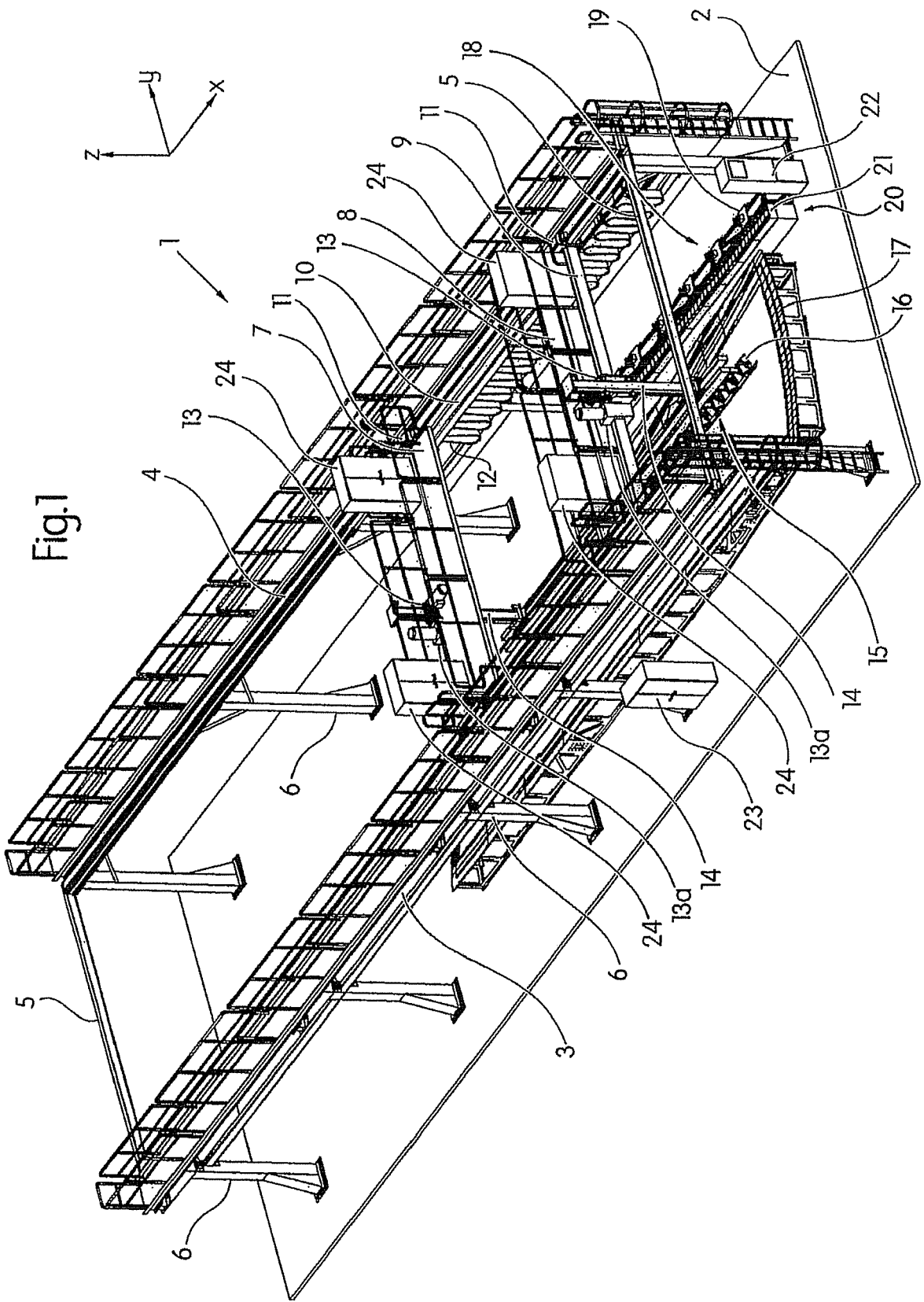
FIG. 1 shows an overall view of the device according to the invention.

FIG. 1 shows an overview of a device 1 for positioning stringers. The latter is constructed on a hall floor 2 and substantially consists of a support frame and a gantry robot. The support frame has two guide rails 3, 4 and two transverse supports 5, which form a support frame resting on a plurality of columns 6. Said guide rails 3, 4 are used to guide the gantry robot and extend in the x-direction of the coordinate system shown. The gantry robot consists of two bridges 7, 8, each with a transverse guide 9, the transverse guide 9 associated with the bridge 7 being concealed because of the perspective view. The two bridges 7, 8, are rigidly connected to one another at their ends, in each case, by longitudinals 10, so they form a rigid frame with the latter. Electric drives 11 are arranged at the two ends of the bridges 8, 9, and cooperate with the guide rails 3, 4. Thus, the entire frame, consisting of the bridges 7, 8 with the transverse guides 9 and the longitudinals 10, can be moved on the guide rails 3, 4 in the x-direction. For this purpose, the relevant drives 11 always work in parallel operation. In this case, pinions arranged on the side of the drives 11 cooperate with toothed belts arranged on the side of the guide rails 2, 3. The toothed belts used are reinforced with glass and aramid fibres, so as little as possible straining of the belts is achieved. Nevertheless, as a result of the large extension of the guide rails 3, 4, an imprecision of about 2 mm is produced with "blind activation". In order to avoid this, an absolute displacement measuring system is used here. In this case, the x-drive of the gantry robot is firstly stopped when the displacement measuring system reports that the x-value to be approached has been reached. The stationary electric functional units are connected to the corresponding mobile units of the gantry robot by means of a cable drag chain 12. Each transverse guide 9 has a z-drive 13 which can be moved thereon in the y-direction and in which a respective lift axle 14 can be moved in the z-direction. The z-drive 13 is based on a recirculating ball screw. Another solution consists in the fact that the z-drive 13 is implemented on the basis of toothed belts. A y-drive 13a is mechanically closely connected to the housing of the z-drive 13, whereby the drive 13 with the lift axle 14 can be moved in the y-direction. The two lift axles 14 carry a gripper beam 15 at their lower ends, so the latter can be moved in the y- and z-direction using the y-drives 13a and z-drives 13, and in the x-direction using the gantry. The gripper beam 15 is equipped with a large number of gripper groups 16, which are used to pick up stringers and deposit them precisely. With the aid of the gripper groups 16, a stringer can be precisely pressed onto the local shape of the inner face of a wing skin. In the drawing, below the gripper beam a laminating adhesion device 17 is fixed to the hall floor 2. Located in the drawing to the outer right next to the laminating adhesion device 17 is a loading unit 18 with a plurality of positioning units 19. Arranged to the left of the loading unit 18 is a heating station 20 with a plurality of infrared radiator modules 21. A central computer 22, which cooperates by means of power electronics with the individual electric drives, is used to input work programs and to control the program sequences. Provided to accommodate said power electronics are a stationary switching cabinet 23 as well as four switching cabinets 24 arranged on the gantry robot, in other words mobile switching cabinets. All the electric drives used in the device are implemented by electric servo motors each with a resolver. In this case, the resolver checks the angular position of the motor shaft and supplies corresponding signals to the process computer 22. Possible process computers and the corresponding power electronics are known industrial products such as Siemens OP 012 (central input and processor unit) or Siemens Sinumerik 840D (power electronics).

Figure 2:
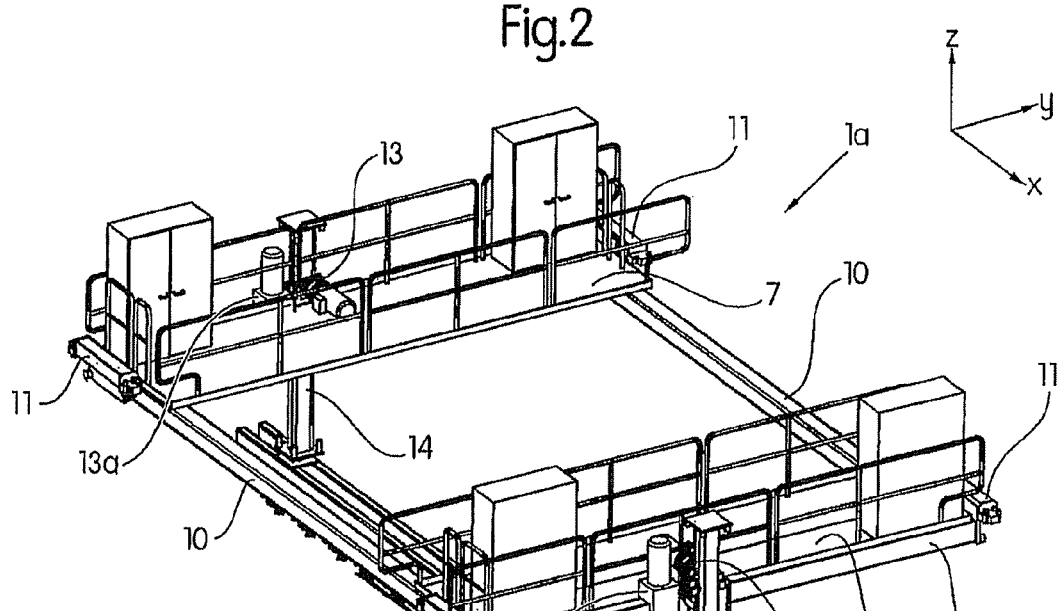
FIG. 2 shows a gantry robot.

FIG. 2 shows the gantry robot 1a as an individual subassembly, detached from the total device and substantially consisting of the bridges 7, 8, the transverse guides 9 and the longitudinals 10. In this case, the transverse guide 9 associated with the bridge 7 is again concealed. In this view, all four drives 11 for moving the robot in the x-direction can easily be seen. Furthermore, the z-drives 13 and the y-drives 13a appear here. The drawing shows further that the gripper beam 15 consists of two individual supports 25, 26, which carry the gripper groups 16. The connections between the lift axles 14 and the gripper beam 15 are articulated in such a way that different positions of the connections in the y- and z-direction are possible, the gripper beam 15 always remaining parallel to itself, however.

Figure 3:
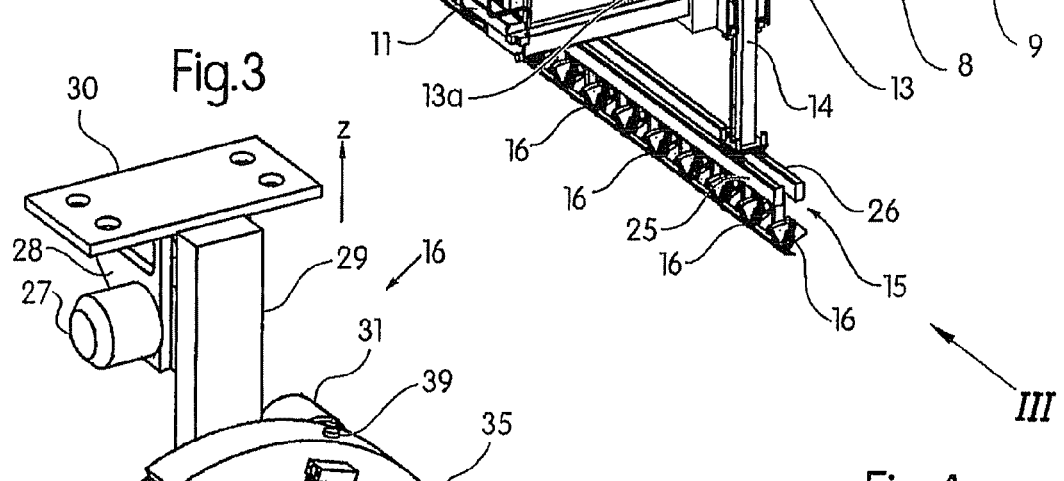
FIG. 3 shows a gripper group in the view III according to FIG. 2.
Figure 4:
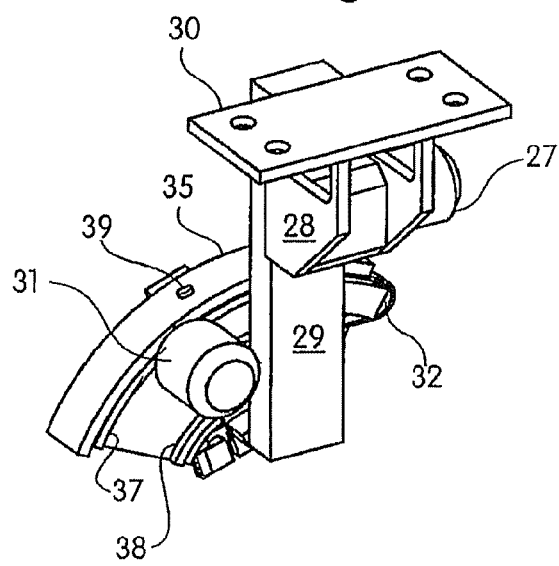
FIG. 4 shows the gripper group according to FIG. 3, shown in the opposite direction.

FIGS. 3 and 4 show a gripper group 16 as an individual subassembly. In this case, FIG. 3 shows the view III of the gripper group 16 according to FIG. 2, and FIG. 4 shows the view of the group in the opposite direction. The gripper group 16 substantially consists of a lift unit and a swivel unit. The lift unit comprises a lift motor 27, a housing 28 and a linear part 29, a flange 30 being used to fasten the gripper group 16 to the supports 25, 26 according to FIG. 2. The lift motor 27 is in operative connection with the linear part 29 by means of a toothed belt, not shown, in such a way that the latter can be moved in the z-direction. In this case, the upper position of the linear part 29 is located between the supports 25, 26. The swivel unit substantially consists of a swivel motor 31, which actuates a swivel part 35 with a parallel gripper 36 by means of a toothed belt 33. The toothed belt 33 is tensioned, proceeding from a pinion on the shaft of the motor 31, in an arcuate manner via a fixed guide part 34 and a roller 32 and back to said pinion. The swivel part 35 has arcuate guide rails 37, 38, which may slide in non-visible guide elements of the guide part 34. Using a driver 39, the movement of the toothed belt 33 is transmitted in the arcuate course thereof to the swivel part 35 and therefore to the parallel gripper 36. Using the arcuate guides, the pivot point of the swivel movement can be located outside the swivel part 35. The parallel gripper 36 has two gripper jaws 40, 41, which are moved with the aid of a gripper motor 42 in the direction of the arrows 43, 44. When depositing a stringer, the latter is held in the correct configuration by the gripper groups 16 located on the gripper beam 15 and lowered with the activated adhesive present on the flange of the stringer onto the relevant wing shell, the linear parts 29 ensuring the necessary contact pressure. The parallel gripper 36 is a 2-finger parallel gripper with a wedge hook system for high force transmission and central tensioning with a multi-tooth slide guide. In this case, the rotary movement of the direct current servo motor with a resolver is converted by means of a spindle nut into an axial movement of the wedge hook. Of the available industrial products of this type, a servo-electric gripper such as the Schunk EGN 100 would be possible.

Figure 5:
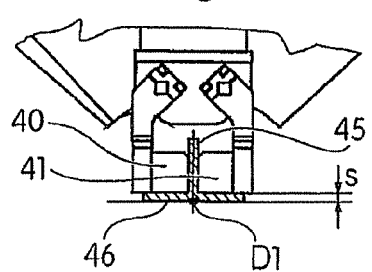
FIG. 5 shows the partial view V according to FIG. 3 with a stringer.

FIG. 5 shows the gripper jaws 40, 41 with a stringer, which appears in cross-section here with the web 45 and the flange 46. In the glued position shown, the flange 46 rests in a planar manner on the lower sides of the gripper jaws 40, 41. The pivot point D1 of the swivel movement of the parallel gripper is located precisely centrally below the lower sides of the gripper jaws 40, 41, offset downwardly by the flange thickness s.

FIG. 6 shows the loading unit 18 with the positioning units 19, which are carried by a frame 47. In this case, all the positioning units 19 are displaceably arranged in the arrow direction 49 on the frame. Located on the left-hand end of the frame 47 in the drawing is a stop plate 48. The drawing furthermore shows a stringer 50. These stringers consist of an already cured fibre-reinforced plastics material and may already, according to their individual installation site, have a twist and/or a bend. The stringers 50 are provided with a layer of adhesive on their flange. This is a melt adhesive which, at room temperature, has a firm consistency and is covered with a protective layer. Before the stringers 50 are placed, for example by hand, into the positioning units 19, the forks 59 are to be brought into the normal position.

FIG. 7 shows the partial view VII of the frame 47 according to FIG. 6 with a stop plate 48 and two positioning units 19. A pneumatic cylinder 51 is arranged inside the frame 47 in such a way that, on the one hand, its piston rod 52 is connected to the positioning unit 19 located closest to the stop plate 48 and, on the other hand, the cylinder 51 is connected to the frame 47. If the cylinder 51 is now loaded with compressed air, the relevant positioning unit 19 is moved in the arrow direction 53. When the pressure is switched off, the positioning unit 19 slides, because of a spring, not shown, back into its starting position again.

FIG. 8 shows, according to the detail VIII of FIG. 6, a positioning unit 19 in more detail. This unit substantially consists of a slide 53, which can slide on two guides 54 secured to the frame and of a centring unit 55 and a support unit 56. The centring unit 55 consists of a housing 57 for a drive, not shown here, and a fork 59 which can be rotated by means of the drive about a vertical axis 58 with the pivot point D2. Because of the function of the fork 59, a pneumatic rotary cylinder is provided here as the drive. In all the positioning units 19 arranged on the loading unit 18, the forks 59 are configured symmetrically with respect to the pivot point D2, the pivot points D2 of all the forks 59 of the provision unit 18 being located precisely on a straight line, the straightening line. The fork 59 may adopt two important positions. On the one hand, a normal position, indicated by the dash-dot line S1, in which the fork 59 is located parallel to the crossbeam 72 and, on the other hand, a clamping position, indicated by the line S2, in which the fork 59 rests rigidly on the stringer with the force of the rotary cylinder.

FIG. 9 schematically shows a rotary cylinder 60 of the aforementioned type with two cylinders 61, 62 and two pistons 63, 64, which are connected to one another by a toothed rod 65. The rotary cylinder 60 also has a toothed wheel 66 meshing with the toothed rod 65, so the linear movement of the toothed rod 65 is converted into a rotary movement and transmitted by means of a drive shaft 67. If, for example, the cylinder 61 is loaded with compressed air, the piston 63 moves in the direction of the arrow 68 and the toothed wheel 66 with the drive shaft 67 is rotated in the clockwise direction. In order to guide the piston 63 back again into its starting position, the cylinder 62 is loaded with compressed air. An industrial product of a known type such as Numatics, model SARE, is a possibility for implementing the rotary cylinder for the fork 59.

FIG. 10 shows the positioning unit 19 corresponding to the view X according to FIG. 8 with the support unit 56. This unit substantially consists of a support plate 68 with four axial slide bearings 69, two lift rods 70 which are mounted vertically in a sliding manner therein, each with an articulated head 71 at its upper end and a crossbeam 72, the ends of which are articulated by means of bearing bolts 73, 74 in the articulated heads 71. A respective driver 75, 76, which can be moved vertically by an electric servo motor 77 in each case, is rigidly connected to the lift rods 70. The lift rods 70 are therefore vertically movable independently of one another. The servo motors 77 are located, in the viewing direction, behind the support plate 68 and are therefore largely concealed. The crossbeam 72 is used as a support for the respective stringer to be provided for the further manufacturing sequence. For this purpose, the crossbeam 72 is brought to the required height with the aid of the servo motors 77. If an oblique position should be necessary, this is produced by different adjustments of the lift rods 70. In order to make this possible, the crossbeam 72 has a slot on the bearing bolt 74.

The function of the positioning units 19 inside the loading unit 18 is to bring the respective stringer into the required position for further processing. For this purpose, the relevant stringer is placed by hand into the forks 59 of the positioning units 19 of the loading unit 18 in such a way that it rests with its flange on the crossbeam 72 of the relevant positioning units 19. Each stringer is provided with a barcode, which contains all the important information on this specific stringer for the process computer 22. So that the same reference point applies to all the stringers, care has to be taken when inserting the stringers that each stringer comes to rest with its "correct" end close to the stop plate 48. In the following automated loading process, the relevant functions take place on the basis of the barcode and are carried out in a program-controlled manner by the pneumatic members or by the servo motors. The crossbeams 72 are firstly moved to the correct height with the aid of the servo motors 77. Secondly, the forks 59 are brought into the clamping position by means of the rotary cylinders. Thus, the stringer is oriented precisely according to the straightening lines of the loading unit 18. Moreover, all the positioning units 19 are now firmly clamped to the stringer, so they can all slide together with the stringer on the guides 54 of the loading unit 18. The pneumatic cylinder 51 according to FIG. 7 is then loaded with compressed air, so the stringer is moved in the direction of the stop plate 48, until it rests thereon. In this position, the stringer is aligned for the takeover by the gripper beam 15 with the gripper group 16.

FIG. 11 shows the positioning unit 19 in the view according to FIG. 8 with a stringer 50. In this case, the stringer 50 is clamped in the fork 59. The drawing furthermore shows the housing 57 and the two servo motors 77.

FIG. 12 shows the heating station 20 according to FIG. 1 consisting of the infrared radiator modules 21 and a base 78. The infrared radiator modules which are a possible heating method should work in the short-wave infrared range, so the highest energy radiation is achieved on the smallest space. Furthermore, the modules should have an online power adjustment for activation by the process computer 22. Modules such as Optron IRX 380 satisfy these conditions.

FIG. 13 shows the laminating adhesion device 17 with a wing skin 79 positioned thereon. The drawing shows the not yet cured wing skin 79 before the application of the stringers.

FIG. 14 shows the view XIV according to FIG. 13 with the laminating adhesion device 17 with the wing skin 79 in the finished state with stringers 50 glued on.

When using the device according to the invention, the following method sequence is produced. The preparations for the process should be carried out first. These include inputting the construction data of the relevant wing skin 79 and the stringer 50 to be integrated therewith into the central computer 22. In this case, each stringer 50 has a clear identification, for example using its part number, which can be inferred from a glued-on machine-readable label using a scanner. Next, the laminating adhesion device 17 with the skin 79 is fed in via a clock pulse by the hall crane into the construction site within the device according to the invention and the zero position with respect to the system is ensured by means of centring bolts. Upon a corresponding command, the gantry robot is referenced using reference holes in the laminating adhesion device 17.

Thereafter, the stringers 50 are removed from the bearing and the respective data thereof is detected using the relevant barcode. On the basis of these details, the support and centring units of the loading unit 18 are adjusted automatically by program according to shape and position. Once these adjustments have taken place, the relevant stringer 50 is placed in the forks 59 of the loading unit 18. Thereupon, the forks 59 are moved into the clamping position and the stringer 50 is brought to rest by means of the cylinder 51 on the stop plate 48. In this position, the stringer is in the take-over position.

In a program-controlled manner, the gantry robot precisely approaches this position and takes over the stringer 50 with its parallel grippers 36. It then moves into a position which allows the operating staff to remove the protective film from the flange 46 of the stringer 50, so the adhesive located here is exposed. The stringer 50 is then moved by the gantry robot over the heating station 20 and brought into the heating position. The infrared radiator modules 21 of the heating station 20 are then switched on to activate the adhesive located on the flange of the stringer 50. In this case, the duration and intensity of heating are automatically controlled by the process computer 22.

Once the heating has taken place, the stringer 50 is moved by means of the gantry robot over the wing skin 79 located on the laminating adhesive device 17 and deposited precisely on the location provided for this stringer 50 until the adhesive layer of the stringer touches the skin 79. A defined contact pressure is then applied by means of the linear parts 29 until the adhesive has set. The length of the stringers 50 is limited for technical reasons. Therefore, in the case of relatively large components, which would actually require longer stringers 50, it is necessary to place a plurality of the available stringers 50 next to one another in a row. In the program present in the process computer 22 for the relevant wing, this is taken into account, so the longer, unavailable stringer is replaced by a plurality of available part-stringers. Correspondingly, the program supplies the commands and the gantry robot joins the individual stringers 50 to one another on the skin 79. Once the automatic integration of all the part-stringers has been carried out by the gantry robot and the adhesive has cured, the connection of the part-stringers is produced manually by corresponding splice connections. This means that the stringers 50 reliably absorb the longitudinal forces occurring during operation. Once this work has been carried out, the uncured shell with the stringers applied is prepared for autoclave curing.

The invention merely consists of the proposed device and the method which can be carried out therewith, all the active members involved being program-controllable in such a way that the functions and work operations to be carried out thereby are triggered and controlled by a numeric processing unit on the basis of a corresponding program. Because of his specialist knowledge, a person skilled in the art in the automation field is easily in a position to design and implement a control electronics system provided for positioning stringers. Details of the electronic controller and the programming are not the subject of the invention. The invention is not limited to the positioning of stringers on wing and tail unit shells, but it also extends to the positioning of stringers on fuselage shells.

The invention claimed is:

1. A device for positioning stringers on a wing skin, wherein both the wing skin and the stringers comprise of a fibre-reinforced plastics material, the device comprising:
   a loading unit configured for aligning a stringer,
   a gantry robot with a gripper beam configured for removing the stringer from the loading unit, wherein a protective film can be manually removed from the stringer, and
   a heating station into which the stringer can be moved by means of the gripper beam, the heating station being configured for activating an adhesive by heating,
   wherein the gantry robot is operable for moving the stringer to a predetermined position on a wing skin, wherein the stringer can be pressed by a plurality of linear parts, wherein the adhesive can be cured, and wherein the gantry robot, the gripper beam and the loading unit are program-controllable by a numeric process computer.

2. The device according to claim 1, wherein the heating station is program-controllable.

3. The device according to claim 1, wherein the gantry robot can be moved by electric drives in a first direction parallel to a longitudinal direction of the wing skin, an absolute displacement measuring system controlling the position of the gantry robot in the first direction.

4. The device according to claim 1, wherein the gantry robot has two parallel guides running in a second direction that is transverse to the wing skin and perpendicular to the first direction, on which a respective z-drive and a y-drive can be moved together in the second direction, each z-drive being used to move a lift axle in a third direction perpendicular to both the first direction and the second direction, and each lift axle being connected at its lower end to the gripper beam.

5. The device according to claim 4, wherein the gripper beam has a plurality of gripper groups, each with a swivelable parallel gripper.

6. The device according to claim 5, wherein each gripper group has a lift motor to move the parallel gripper in the third direction and a swivel motor to swivel the parallel gripper.

7. The device according to claim 1, wherein the loading unit has a frame with an elongate shape and with a plurality of positioning units, and is provided at one end with a stop plate, the positioning units being displaceably mounted in the longitudinal direction on the frame.

8. The device according to claim 7, wherein the positioning unit adjacent to the stop plate can be displaced by means of a pneumatic cylinder.

9. The device according to claim 8, wherein each positioning unit comprises a centring unit with a fork and a support unit with a crossbeam.

10. The device according to claim 9, wherein a rotary cylinder is provided to actuate the fork.

11. The device according to claim 9, wherein two motors are provided to actuate the crossbeam.

12. The device according to claim 1, wherein infrared radiators of the heating station work in the short-wave infrared range.

13. A method for positioning stringers on an aircraft wing skin, wherein both the wing skin and the stringers consist of a fibre-reinforced plastics material, the method comprising:
  a. aligning a stringer in a loading unit,
  b. removing the stringer from the loading unit by a gantry robot using a gripper beam and manually removing a protective film from the stringer
  c. moving the stringer into a heating station by means of the gripper beam and activating an adhesive by heating,
  d. moving the stringer to a predetermined position on a wing skin by the gantry robot and pressing the stringer by a plurality of linear parts, and
  e. curing the adhesive wherein the gantry robot the gripper beam, and the loading unit are program controlled by a numeric process computer.

\* \* \* \* \*